United States Patent
Smith et al.

(10) Patent No.: US 7,172,299 B2
(45) Date of Patent: Feb. 6, 2007

(54) INTEGRATED WAVEFRONT CORRECTION MODULE WITH REDUCED TRANSLATION

(75) Inventors: Mark Anderson Smith, Ayer, MA (US); Jeffrey L. Cavaco, Boylston, MA (US); Zaffir A. Chaudhry, Glastonbury, CT (US)

(73) Assignee: Xinetics, Inc., Devens, MA (US)

( * ) Notice: Subject to any disclaimer, the term of this patent is extended or adjusted under 35 U.S.C. 154(b) by 79 days.

(21) Appl. No.: 10/935,889

(22) Filed: Sep. 8, 2004

(65) Prior Publication Data
US 2006/0050420 A1   Mar. 9, 2006

(51) Int. Cl.
G02B 5/08   (2006.01)
(52) U.S. Cl. .................................. 359/849; 359/224
(58) Field of Classification Search .................. 359/849
See application file for complete search history.

(56) References Cited

U.S. PATENT DOCUMENTS 4,655,563 A * 4/1987 Plante et al. ................. 359/849
5,414,565 A * 5/1995 Sullivan et al. ............. 359/849
6,947,201 B2   9/2005 Ealey ........................... 359/295
2006/0050419 A1   3/2006 Ealey ........................... 359/849

* cited by examiner

Primary Examiner—Euncha P. Cherry
(74) Attorney, Agent, or Firm—Landiorio & Teska

(57) ABSTRACT

An integrated wavefront correction module including a mounting device a deformable mirror carried by the mounting device for correcting for high spatial and temporal frequency error in an incident wavefront and a tip-tilt correction mechanism including a base and a plurality of tip-tilt actuators interconnected between the base and one of the flexible and fixed portions and a plurality of support posts interconnected between the base and the other of the flexible and fixed portions or alternatively the tip-tilt correction mechanism may include at least one actuator platform, a base, a first set of tip-tilt actuators for adjustably supporting the at least one actuator platform from the base and a second set of tip-tilt actuators for adjustably supporting the mounting device from the at least one actuator platform for adjusting the mounting device and the deformable mirror together to compensate for tip-tilt errors in the incident wavefront with the tip-tilt actuators being operated typically at mid-range in order to define a center of rotation at the mirror surface.

21 Claims, 15 Drawing Sheets

INTEGRATED WAVEFRONT CORRECTION MODULE WITH REDUCED TRANSLATION

FIELD OF THE INVENTION

This invention relates to an integrated wavefront correction module with reduced translation.

BACKGROUND OF THE INVENTION

Recent improvements in adaptive optical system wavefront correction have introduced an improved integrated wavefront correction module which combines in a single integrated package both the tip-tilt error correction and high spatial and temporal frequency wavefront error correction. See co-pending U.S. patent application, entitled, Integrated Wavefront Correction Module, Ealey et al. (XIN-110J) filed on even date herewith, owned by the same assignee as the instant application and herein incorporated in its entirety by this reference. This dramatically reduces the size, cost, and complexity of the equipment. However, some problems persist. Tip-tilt correction rotations are not constrained to be about the center of the mirror which can introduce translation errors and beam steering inaccuracy. In addition, the tip-tilt compensation provided by such a module is a function of the stroke of the actuators and is uniform across the power spectral band while the tip-tilt error is not.

BRIEF SUMMARY OF THE INVENTION

It is therefore an object of this invention to provide an improved integrated wavefront correction module.

It is a further object of this invention to provide such an improved integrated wavefront correction module with reduced translation.

It is a further object of this invention to provide such an improved integrated wavefront correction module which enables tip-tilt rotation about the mirror surface center with accurate low translation steering.

It is a further object of this invention to provide such an improved integrated wavefront correction module which can better match the tip-tilt correction to the power spectral distribution.

It is a further object of this invention to provide such an improved integrated wavefront correction module which can use the cumulative effect of multiple sets of actuators to increase the available stroke.

It is a further object of this invention to provide such an improved integrated wavefront correction module which can provide either beam steering with large angle and lower bandwidth or fast steering (fast tip-tilt compensation) with higher bandwidth.

The invention results from the realization that an improved wavefront correction module that enables tip-tilt rotation about the mirror surface with minimum translation can be achieved in a module which integrates the deformable mirror with the tip-tilt mechanism and applies the tip-tilt compensation rotation to the deformable mirror about the mirror surface.

This invention features an integrated wavefront correction module including a mounting device having a compound flexure plate with fixed portions and flexible portions and a deformable mirror carried by the mounting device for correction for high spatial and temporal frequency error in an incident wavefront. A tip-tilt correction mechanism includes a base and a plurality of tip-tilt actuators interconnected between the base and one of the flexible and fixed portions. There are a plurality of support posts interconnected between the base and the other of the flexible and fixed portions for adjusting the mounting device with the deformable mirror to compensate for tip-tilt errors in the incident wavefront.

In a preferred embodiment the mounting device may include a support frame for carrying the deformable mirror. The deformable mirror may include a mirror surface and a plurality of mirror actuators for deforming the mirror surface. The mirror surface may be mounted at the mid-range of the stroke of tip-tilt actuators for defining a center of rotation at the mirror surface. The tip-tilt mechanism may include a flexure end tab for engaging each tip-tilt actuator with the flexure plate. There may be a support frame for interconnecting the base and the flexure plate at the fixed portions. There may be at least three support posts and three tip-tilt actuators. The deformable mirror may include a transverse electrodisplacive actuator array. The transverse electrodisplacive array may include a support structure and a plurality of ferroic electrodisplacive actuator elements extending from proximate end at the support structure to a distal end. Each actuator element may include at least one addressable electrode and one common spaced from the addressable electrode and extending along the direction of the proximate and distal ends along the transverse $d_{31}$ strain axis. There is a reflective member having a reflective surface and a mounting surface mounted on the actuator elements. A plurality of addressable contacts and at least one common contact apply a voltage to the addressable and common electrodes to induce a transverse strain in addressed actuator elements to effect an optical phase change in the reflective surface at the addressed actuator elements. The actuator elements may be integral with the support structure.

This invention also features an integrated wavefront correction module including a mounting device and a deformable mirror carried by the mounting device for correcting for high spatial and temporal frequency error in an incident wavefront. There is a tip-tilt correction mechanism including at least one actuator platform, a base, a first set of tip-tilt actuators for adjustably supporting the at least one actuator platform from the base and a second set of tip-tilt actuators for adjustably supporting the mounting device from the at least one actuator platform in order to adjust the mounting device and the deformable mirror to compensate for tip-tilt errors in the incident wavefront.

In a preferred embodiment there may be a stack of actuator platforms and a number of sets of tip-tilt actuators for interconnecting the first actuator platform in the stack at the base, the last actuator platform in the stack with the mounting device and interconnecting each of the platforms with the adjacent platforms in the stack. The deformable mirror may include a mirror surface and a plurality of mirror actuators for deforming the mirror surface. The mirror surface may be mounted at the mid-range of the stroke of the tip-tilt actuators for defining a center of rotation at the mirror surface. The tip-tilt mechanism may include a flexure end tab for engaging each tip-tilt actuator with the flexure plate. There may be a control system for powering each set of tip-tilt actuators in a different spectral range of the tip-tilt error. The control system may power each set of tip-tilt mirror actuators. There may be at least three tip-tilt actuators in each set. The deformable mirror may include a transverse electrodisplacive actuator array. The transverse electrodisplacive actuator array may include a support structure, and a plurality of ferroic electrodisplacive actuator elements extending from proximate end at the support structure to a distal end. Each actuator element may include at least one addressable electrode and one common electrode spaced from the addressable electrode and extending along the direction of the proximate distal ends along the transverse $d_{31}$ strain axis. A reflective member may have a reflective surface and a mounting surface mounted on the actuator elements and there may be a plurality of addressable contacts and at least one common contact for applying voltage to the addressable and common electrodes to induce a transverse strain in addressed actuator elements to effect an optical phase change in the reflective surface at the addressed actuator elements. The actuator elements may be integral with the support structure.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
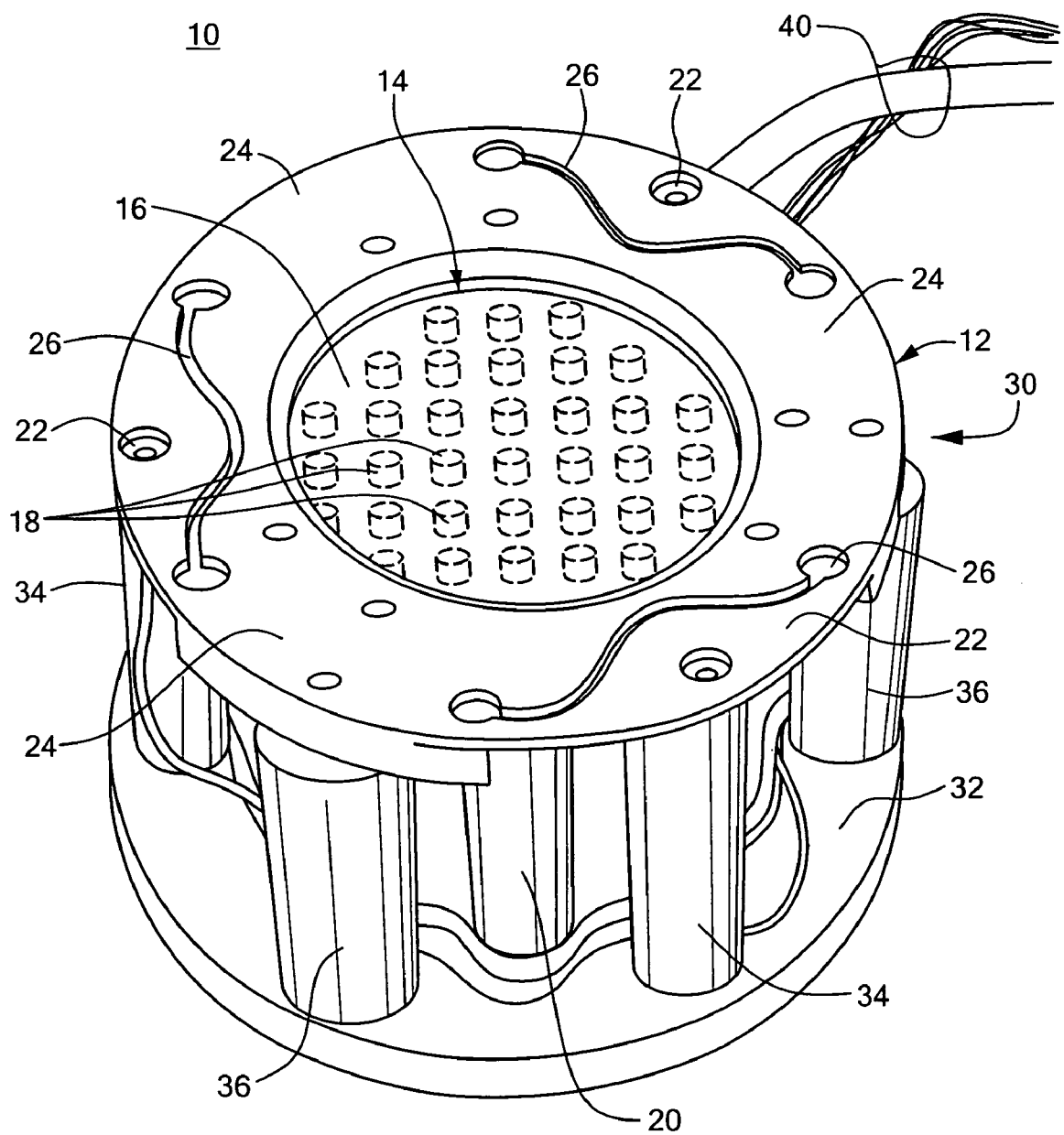
FIG. 1 is a three dimensional view of an integrated wavefront correction system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 an integrated wavefront correction system 10 according to this invention including a mounting device 12, which carries a deformable mirror 14. Deformable mirror 14 includes a mirror surface 16 and a plurality of mirror actuators 18 arranged about center axis 19 which deform the mirror to correct for high spatial and temporal frequency errors in an incident wavefront. Deformable mirror 14 is carried in a support structure such as well or cradle 20, which is carried by mounting device 12. Mounting device 12 may include a compound flexure plate 13 having fixed portions 22 and flexible portions 24 created by cut outs 26. The tip-tilt mechanism 30 includes base 32 and three posts, 34 only two of which are visible in FIG. 1 which attach to the fixed portions 22 of compound flexure plate 13, mounting device 12 tip-tilt mechanism 30 also conducts three tip-tilt actuators 36 only two of which are visible in FIG. 1 which attach to the flexible portions 24. It is the interconnections of posts 34 between base 32 and fixed portions 22 of flexure plate 13 that makes those fixed portions 22 fixed. Fixed portions 24 are fixed because they are rigidly connected to base 32 by posts 34. The fixed portions 24 can become the flexible portions and the flexible portions 22 can become the fixed portions simply by interchanging the connection of actuators 36 and posts 34. The power to drive actuators 18 and actuators 36 is delivered through cables 40.

Figure 2:
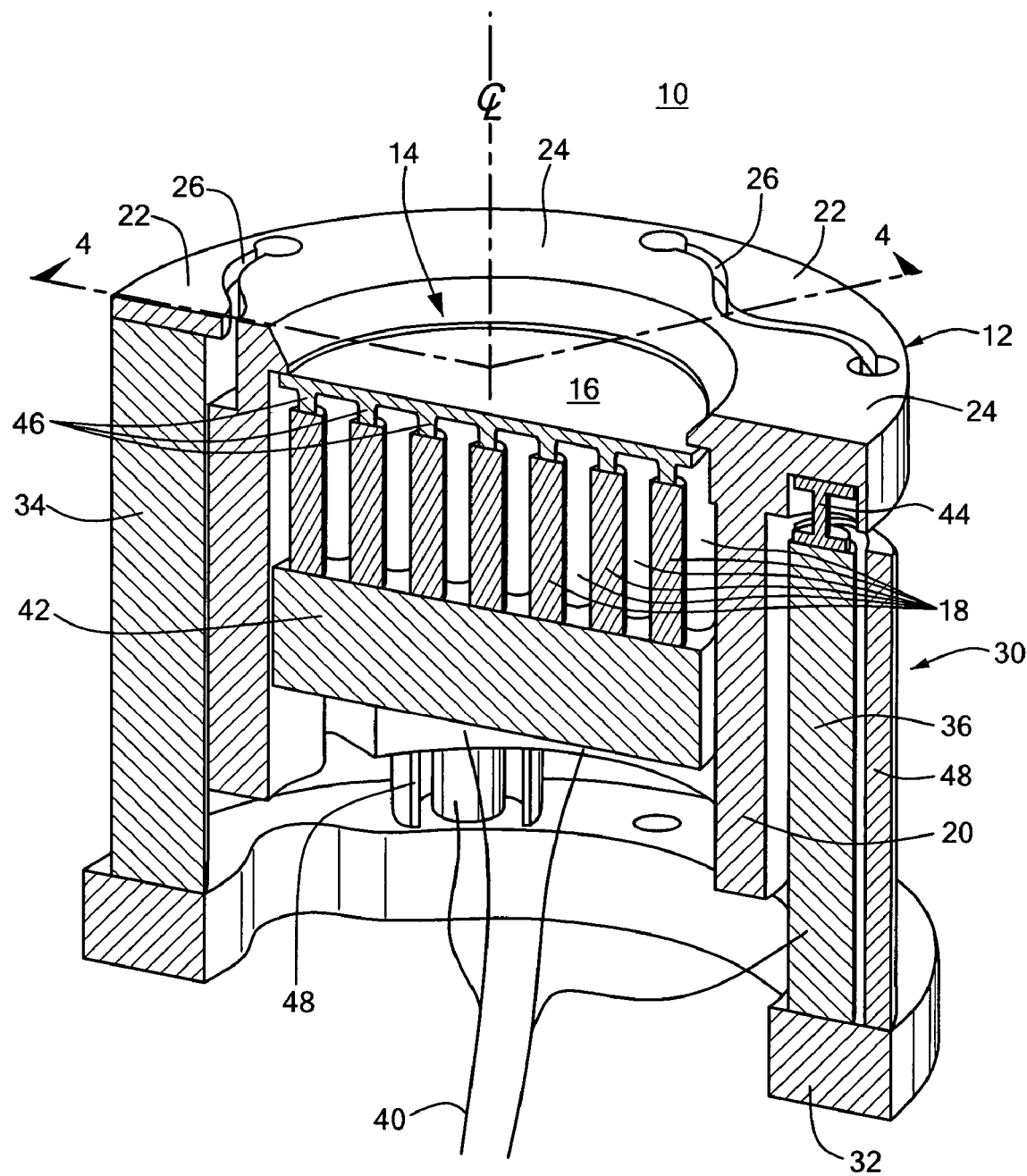
FIG. 2 is a view of the integrated wavefront correction system of FIG. 1 with portions broken away and shown in partial section.

Support structure, well or cradle 20 may be integral with flexure plate 13, FIG. 2. And deformable mirror 14 may also include a reaction mass 42, which may be fixed to support structure or cradle 20 by welding or adhesive. There may be a flexure end tab 44 made of e.g. stainless steel, for engaging the end of each tip-tilt actuator 36 with mounting device 12. Similar flexure end tabs 46 may be provided to engage mirror surface 16 with actuators 18. Although flexure end tabs 46 are shown to be integral with mirror surface 16 this is not a necessary limitation of the invention. Actuators 36 may be covered by shields 48.

Figure 3:
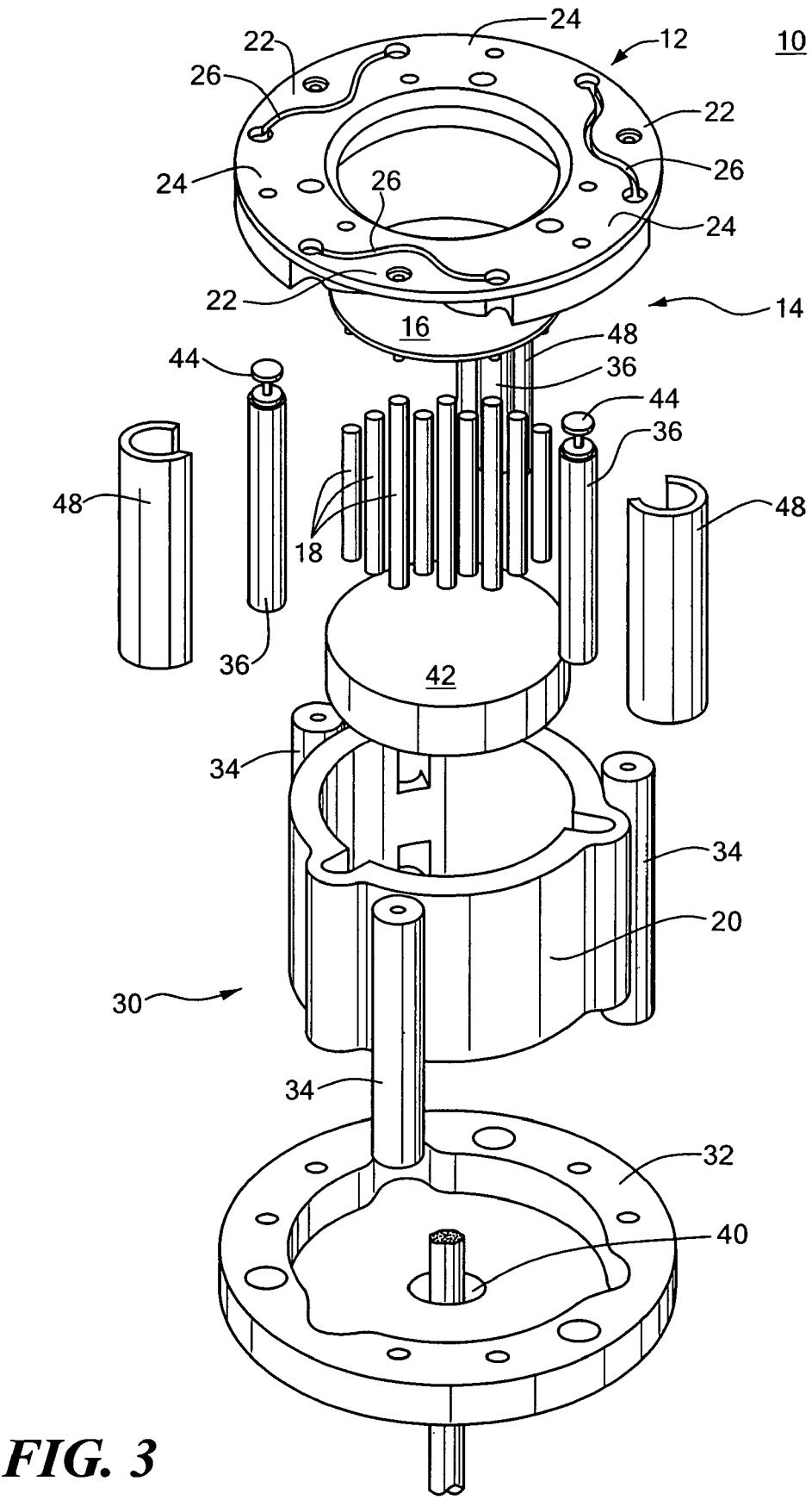
FIG. 3 is an exploded three dimensional view of the integrated wavefront correction system of FIGS. 1 and 2.

The structure of integrated wavefront correction system 10 can perhaps be more readily seen in the exploded view of FIG. 3. Base 32, typically of aluminum, supports posts 34 that are attached to fixed portions 22 of mounting plate 12, which in this case may be a compound flexure plate. Tip-tilt actuators 36 are also attached to aluminum base 32 and are engaged through flexure end tabs 44 with the flexible portions 24 of mounting device 12. Shields or covers 48 for tip-tilt actuators 36 may be aluminum as may support structure or cradle 20 which in this case is fixed by means of bolts not shown to mounting device 12. Mirror actuators 18 may be fixed to reaction mass 42 in any suitable fashion by pins, welding or adhesive or other ways and reaction mass 42 may be made of Pyrex for example. Mirror actuators 18 may be XIRE4016's and tip-tilt actuators 36 may be XIRE0750's both obtainable from Xinetics, Inc. of Devens, Mass. Tip-tilt actuators 36 typically have a stroke of 10 to 40 μm and mirror actuators 18 have a stroke of 3 to 6 μm.

In operation the integrated nature of wavefront correction system 10 accomplishes both high spatial and temporal frequency wavefront correction and separate tip-tilt mirror correction in one unit. High spatial and temporal wavefront errors are corrected by the deforming of mirror surface 16 by the selective operation of mirror actuators 18. But mirror surface 16 and the entire deformable mirror 14 including mirror surface 16, actuators 18 and reaction mass 42 are in turn carried by mounting device 12 which is itself controlled by tip-tilt actuators 36 to compensate for tip-tilt errors in the incident wavefront. In this way, an incident wavefront has both corrections made for it by a single device, thereby eliminating the need for two correctional devices along with the necessary optical relays and the space required to accommodate all that equipment.

Figure 4:
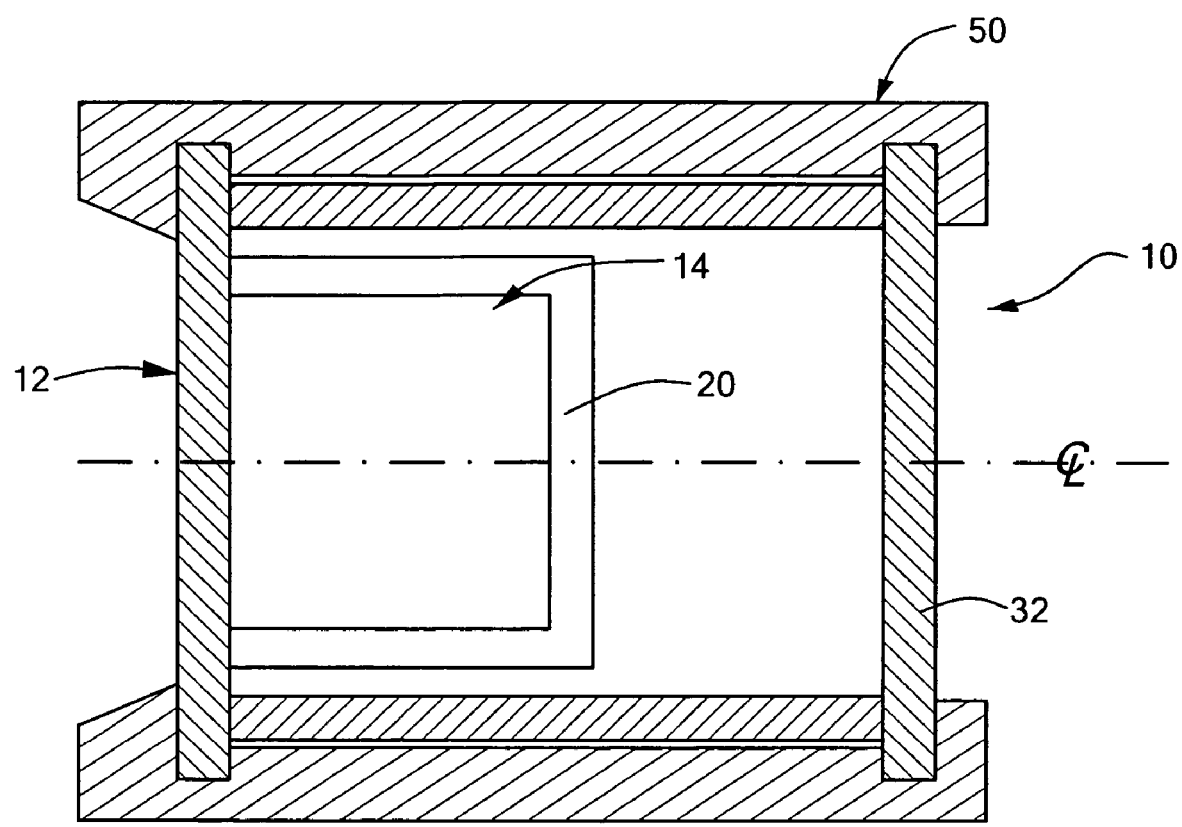
FIG. 4 is a diagrammatic sectional view taken along lines 4—4 of FIG. 2 showing a rigidified version of the system of FIGS. 1–3.

It is desirable to have the frequency of operation of the mirror actuators 18 well removed from the frequency of operation of the tip-tilt actuator 36 so that the two systems do not dither or chase each other in attempting to correct wavefront distortion. To do this typically the mirror actuators 18 may be operated at approximately 1100 cycles per second whereas the tip-tilt actuators 36 may be operated at 50 cycles per second. In order to further separate these two operational frequencies, system 10 may be mounted in a rigid frame or sleeve 50, FIG. 4, which is attached both to base 32 and mounting device 12 but only at the fixed portions 22 of mounting device 12 so that the added rigidity which increases the operating frequency for actuators 36 to close to 1800 cycles per second does not interfere with the motion of the flexible portions 24 that are required to flex to accommodate for tip and tilt errors in an incident wavefront.

Figure 5:
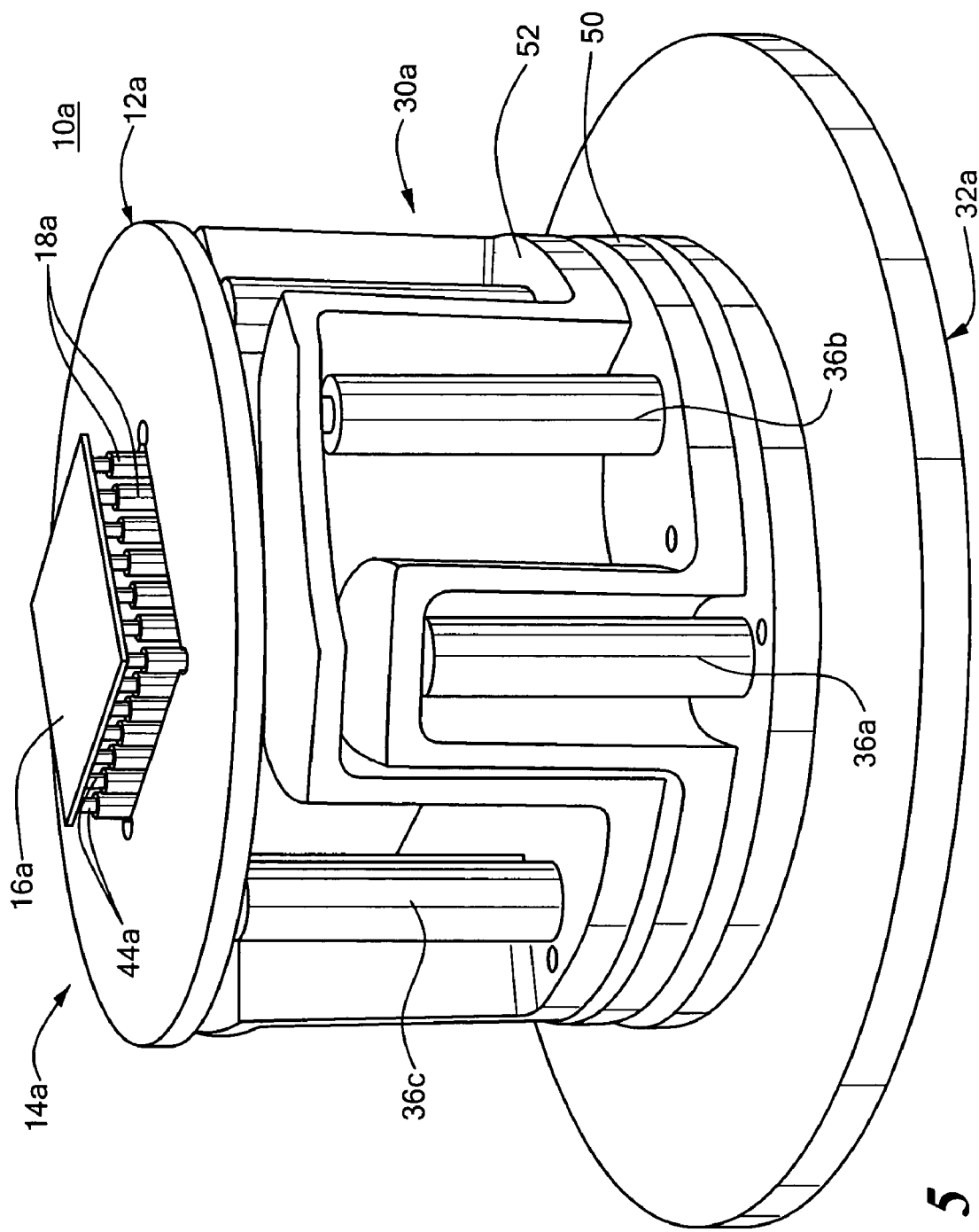
FIG. 5 is a three dimensional view of another multi-tiered stacked embodiment of the integrated wavefront correction system according to this invention.

In another embodiment integrated wavefront correction system 10a, FIG. 5, where like parts have been given like numbers and similar parts like numbers accompanied by a lower case letter, tip-tilt mechanism 30a includes one or more platforms stacked between base 32a and mounting device 12a with sets of tip-tilt actuators 36a, 36b, 36c interconnecting the base, the successive platforms 50 and 52 and mounting device 12a.

Figure 6:
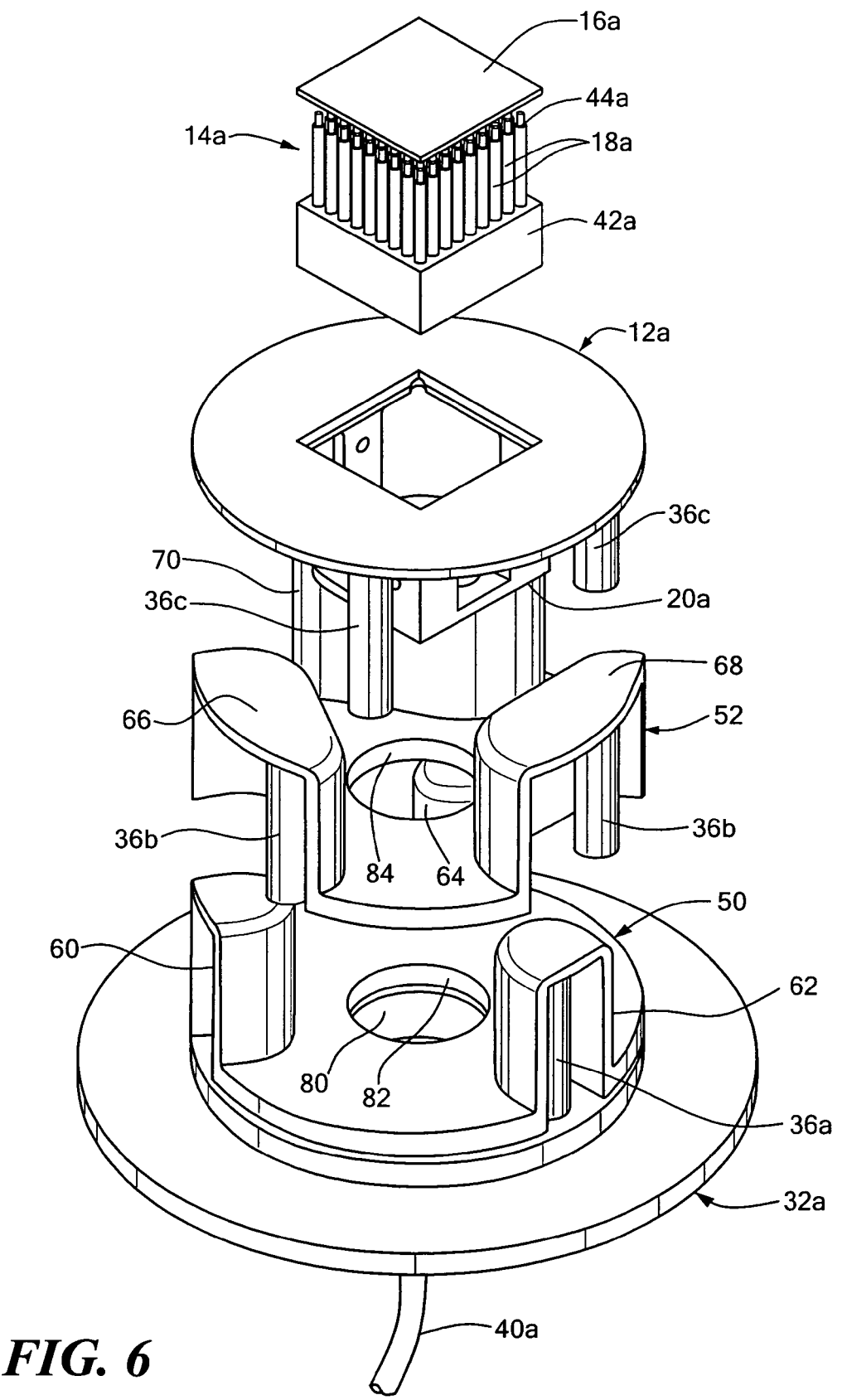
FIG. 6 is an exploded three dimensional view of the integrated wavefront correction system of FIG. 5.

The structure can be more easily understood with respect to FIG. 6 where it can be seen that platform 50 includes three single width compartments 60, 62 and 64 for accommodating one each of the set of tip-tilt actuators 36a, b, c. Actuators 36a are fastened to base 32a and to the top of compartments 60, 62, and 64. Platform 52 includes three double width compartments 66, 68 and 70, each of which accommodates or nests compartments 60, 62 and 64, respectively, of platform 50 and one of the second sets of tip-tilt actuators 36b. Tip-tilt actuators 36b are fixed to the tops of compartments 66, 68 and 70 and to platform 50. The set of tip-tilt actuators 36c interconnect mounting device 12a with platform 52. The holes 80, 82 and 84 in base 32a platform 50 and 52, respectively, accommodate cable 40a which connects to mirror actuators 18a and the sets of tip-tilt actuators 36a, 36b and 36c. The entire structure may be made of silicon and carbide, stainless steel, aluminum or Invar. In this embodiment, tip-tilt actuators 36a, b and c may be implemented using XIRE4016's obtainable from Xinetics, Inc. of Devens, Mass. and the mirror actuators 18a may be implemented with a transverse electrodisplacive actuator as disclosed in U.S. patent application Ser. No. 10/730,514, filed Dec. 8, 2003, entitled Transverse Electrodisplaysive Actuator, by Mark A. Ealey, assigned to the assignee in the instant case and included herein in its entirety by this reference.

In this embodiment, mirror actuators 18a may have a stroke of three to four micrometers while tip-tilt actuators 36a, b, and c may have a stroke of three to 6 μm.

Figure 7:
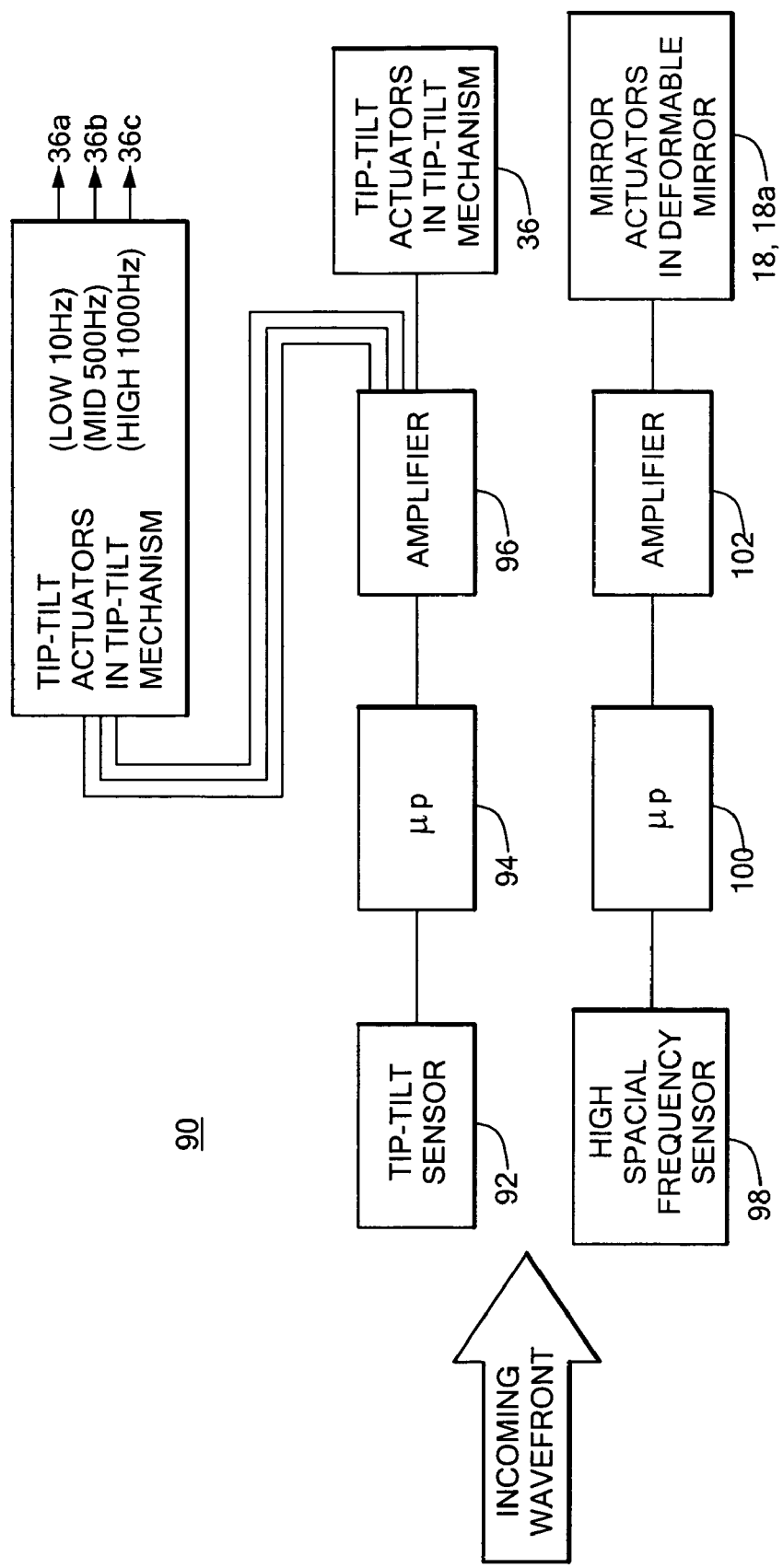
FIG. 7 is a schematic diagrammatic view of a control system for sensing tip-tilt and high spatial and temporal frequency wavefront errors and generating drive signals for the tip-tilt mechanism and deformable mirror of the integrated wavefront correction system of this invention.

A typical control system 90, FIG. 7, includes a tip-tilt sensor 92 for sensing the tip-tilt distortion in an incident wavefront and a microprocessor 94 employing a conventional algorithm to generate the necessary compensating signals which are delivered to, for example, amplifier 96. It then provides those signals to the tip-tilt actuators 36 in the tip-tilt mechanism. At the same time, a high spatial and temporal frequency sensor 98 in the same integrated wavefront correction system according to this invention senses the high spatial and temporal frequency errors and again, using standard algorithms in microprocessor 100, determines the necessary compensating signals which after being amplified by amplifier 102 are used to drive the mirror actuators 18 or 18a in the deformable mirror. In this way both the tip-tilt errors and the high spatial and temporal frequency errors in a specific wavefront are accommodated by the single integrated system according to this invention.

Figure 8:
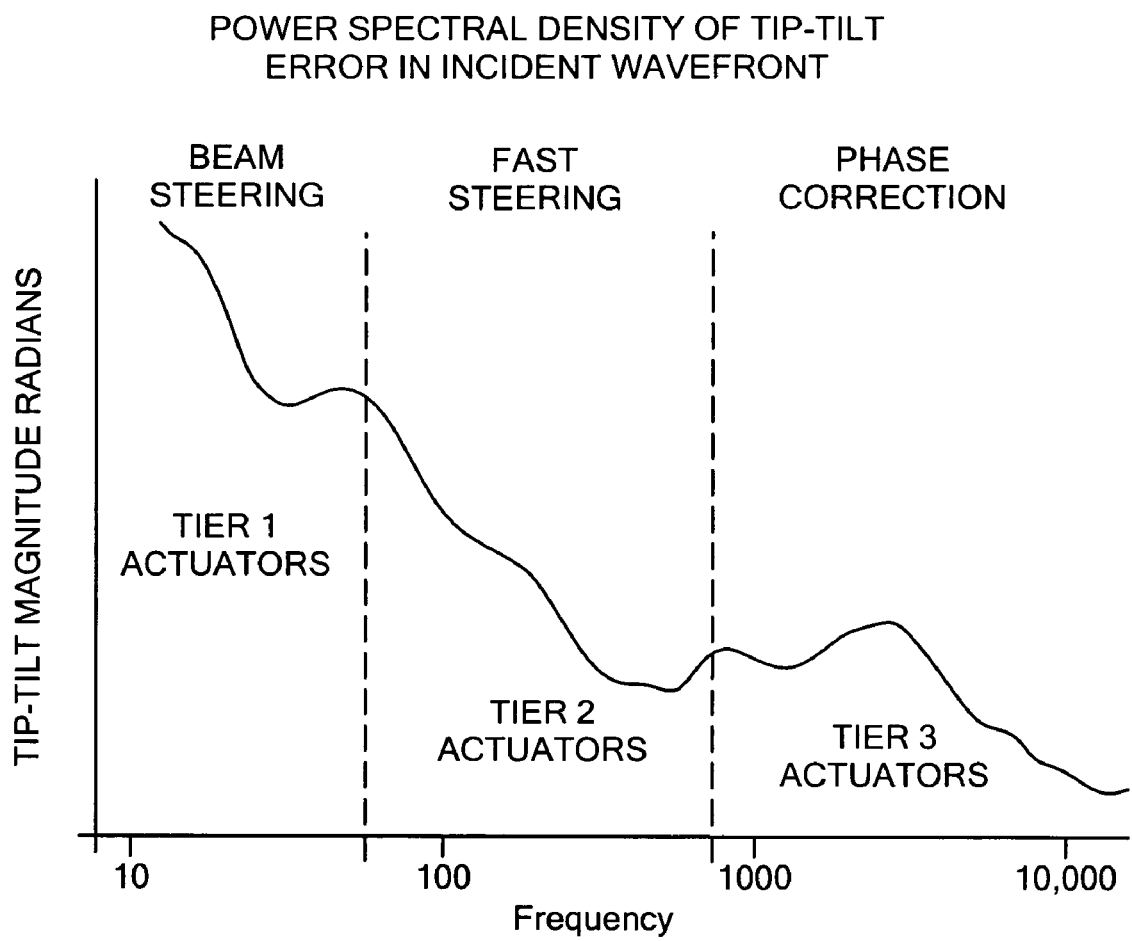
FIG. 8 is a graph illustrating the power spectral distribution of tip-tilt error in a wavefront.

The stacking of the platforms and sets of tip-tilt actuators as shown in FIGS. 5 and 6 not only increases the stroke available from the tip-tilt actuators in a more compact package but also allows a tailoring of operation to match the power spectral density of the tip-tilt error in the incident wavefront. In FIG. 8 it can be seen that the tip-tilt magnitude is greatest in the 10 to 100 hertz range, decreases in the 100 to 1,000 range and levels off and then decreases again in the 1,000 to 10,000 hertz range. The invention can be utilized to greater match the power spectral density of the tip-tilt error by providing a set of signals from microprocessor 94 so that amplifier 96 provides a low 10 hertz, mid 500 hertz, or high 1000 hertz compensating signal to mirror actuator sets 36a, 36b, and 36c respectively, so that while each set is indeed operating in series to obtain a much greater stroke and a more compact package there also better matching of the error compensation by compensating more in the lower frequency and less in the higher frequency and moderately in the intermediate frequencies using the separate tip-tilt actuator sets.

Figure 9:
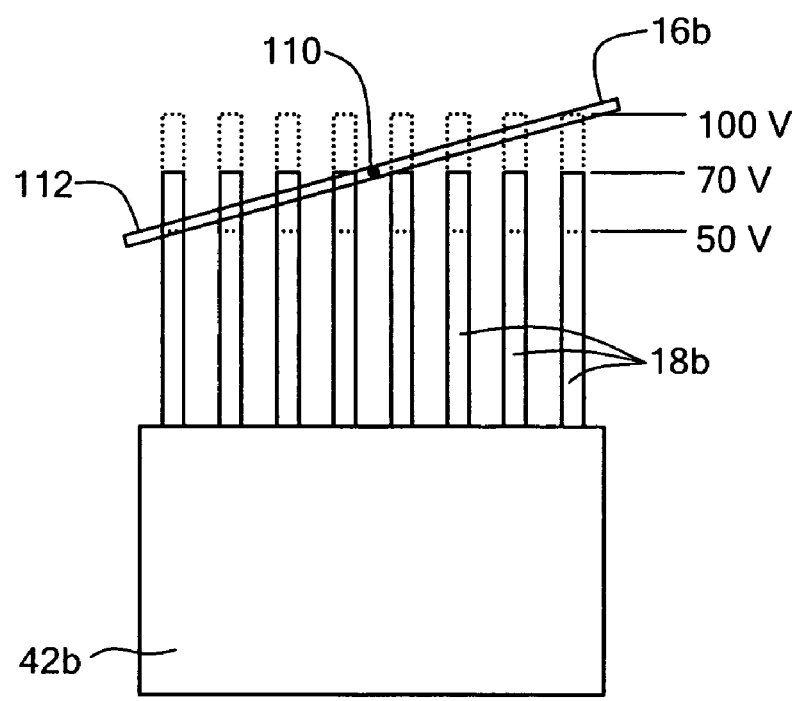
FIG. 9 is a schematic diagram illustrating the improved rotation characteristics of the mirror surface in accordance with this invention.

Another virtue of this invention is that the mirror surface 16b, FIG. 9, of deformable mirror 14b can be made to nominally deform or rotate about a point 110 on its surface by setting the quiescent or operating point at the mid-range of the stroke of actuators 18b, for example at 70 volts, so that when the one portion 112 of the mirror is deformed downwardly to the lower range, for example 50 volt range, and another portion 114 is deformed upwardly to the higher, for example 100 volt range, the center 110 remains fairly stable, thereby reducing translation effects and improving the accuracy of beam steering.

Flexure plate 13 constrains tip-tilt rotation about the center of the mirror while off-loading weight of the deformable mirror to rigid posts 34 instead of actuator 36 as discussed with reference to FIG. 9. And flexure plate 13 in conjunction with its fixed portion 24 provides added rigidity for the module even when mounted in side position with center line 19 orientated horizontally as in FIG. 4.

In one preferred embodiment deformable mirror 14 may include transverse electrodisplacive array 48, as disclosed in U.S. patent application Ser. No. 10/730,514, filed Dec. 8, 2003, entitled Transverse Electrodisplacive Actuator Array, by Mark A. Ealey assigned to the same assignee and incorporated herein in its entirety by this reference. Transverse electrodisplacive actuator array 248 includes a plurality of actuators, 250, 252, FIG. 10, mounted on support structure 254, which utilizes the strain along the transverse axis $d_{31}$, rather than along the longitudinal axis $d_{33}$ to expand and contract actuator 250. In this case, each actuator includes at least two electrodes, an addressable electrode, 256 and a common electrode 258. Addressable electrode 256 connects to contact 260 on the surface 262 of support structure 254, while common electrode 258 connects to contact 264, on surface 266. In this construction, the electrodes are generally parallel to the direction of expansion and contraction as opposed to transverse to it. One advantage is that the interfacial stress is no longer a factor, as any separation or crack that occurs is not in series with the force or displacement, but rather transverse to it, so that it will not effect the operation of the device. In addition, the stroke obtained is no longer dependent on the number of electrodes and ceramic layers in the laminate stack, but rather is dependent on the length of actuator 250, FIG. 10.

Figure 10:
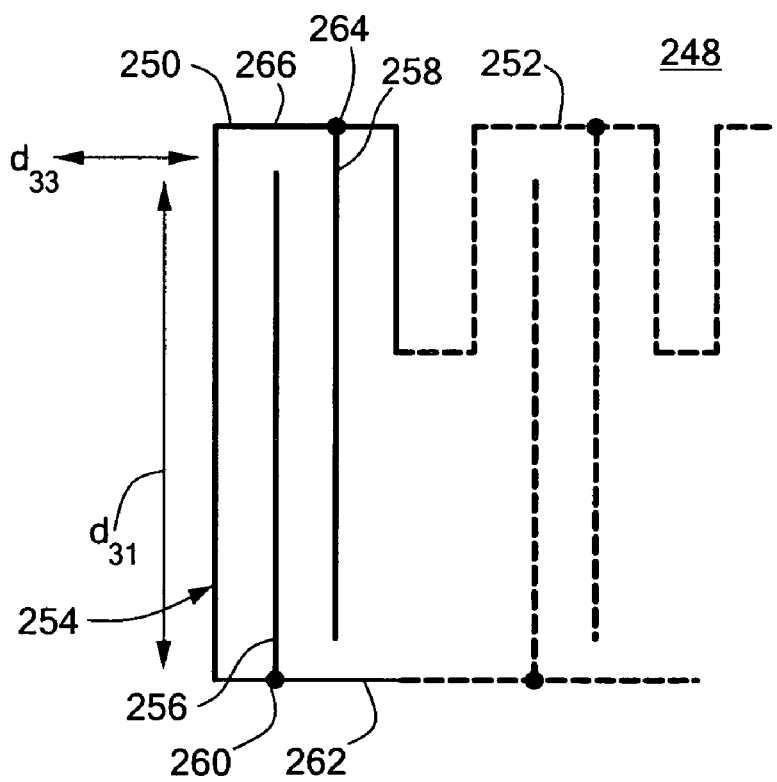
FIG. 10 is a simplified schematic view of a transverse electrodisplacive actuator usable in this invention.
Figure 11:
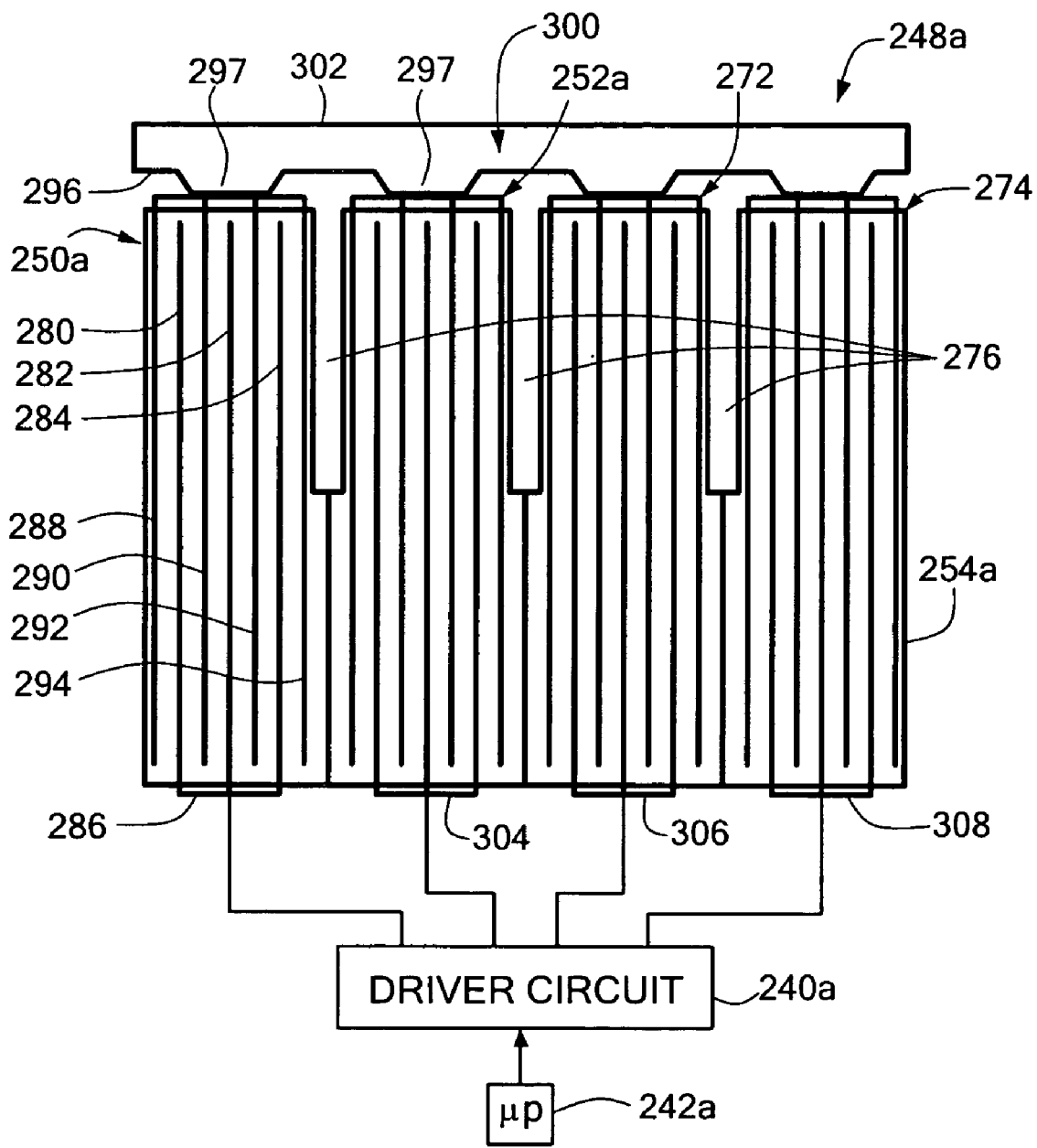
FIG. 11 is a simplified schematic view of a transverse electrodisplacive actuator array using the transverse electrodisplacive actuator of FIG. 10.

Actuator 250, 252, FIG. 10, may be a part of a larger array 248a, FIG. 11, which includes a number of actuators, 250a, 252a, 272, and 274. Actuators 250a, 252a, 272 and 274 are mounted on support structure 254a, which may be integral with them. Their separation may be effected by kerfs or saw cuts, 276, which separate them in two dimensions from each other, so they can act as independent elements. Also, as shown, each element may have more than just one addressable electrode and one common electrode. For example, as shown in FIG. 11 with respect to actuator 250a, there are three addressable electrodes, 280, 282, and 284, which are connected as a unit to addressable contact 286. And there may be more than one common electrode. For example, there may be four common electrodes 288, 290, 292, and 294 connected as a unit to common contact 296, which is plated on the mounting surface, 298 of reflective member 300. Reflective member 300 contains on its other side the reflective surface 302, which is typically a continuous surface. Thus by selectively addressing addressable contact 286 one can cause actuator 250a to expand or contract and cause a bulge or depression in surface 302 in the locality of actuator 250a. Similarly when addressable contacts 304, 306, and 308 are selected surface 302 will be driven in the area local to the associated actuators 250a, 252a, 272, 274, respectively, to form a bulge or a depression depending upon the voltage applied to shape the optical wave front being reflected from surface 302. Typically the voltage applied may have a quiescent level at 70 volts, so that an increase of 30 volts will drive the actuator in one direction to expand or contract and a decrease in voltage of 30 volts would drive it in the other. Detents 297 of mounting surface 298 are connected to actuators 252a, 254a, 272 and 274 by any suitable adhesive or bonding technique. The actuator elements have their proximate ends supported by the support structure. Their distal ends support the reflective member. The addressable and common electrodes are spaced apart and generally parallel to each other. The electrodes extend along in the direction of the proximate and distal ends of the actuator elements along the transverse $d_{31}$ strain axis.

Transverse electrodisplacive actuator array 248 utilizes the transverse strain of a ferroic e.g. ferroelectric or ferromagnetic material such as an electrostrictive ceramic, lead magnesium niobate (PMN), to produce a scalable, large stroke microactuator which operates at low voltage and works well in the area of 293° K. (room temperature). Using other materials such as tungsten based or strontium based materials allows for operation in the area of 125K–200K and 30K–65K, respectively. By utilizing the transverse strain component, the ceramic/electrode interfacial stress is reduced and the electrical interconnection of a densely packed structure is simplified. The electrode interface structure is less sensitive to machining tolerances, is more modular in terms of performance and reproducibility, and is more cost effective. Fewer laminates are required to form the actuator and the length is scaled to meet stroke requirements. Electrical interconnection is accomplished by incorporating printed circuit board technology in a common back plane. The transverse electrodisplacive actuator arrangement provides a scalable configuration compatible with up to $10^7$ channels of operation. The problems associated with the longitudinal multilayer actuator (electrical interconnects, interfacial stress, and precision machining during manufacture) are resolved by incorporating the transverse mode of operation. Array 248 may be made of a co-fired interleaved ceramic and electrode layers or may be made of a single crystal material such as but not limited to lead magnesium nitrate, lead zirconate nitrate.

The transverse electrodisplacive actuator array of this invention utilizes the transverse electrostrictive strain of PMN or other ferroic, ferroelectric or ferromagnetic material to produce a large stroke, low voltage displacement microactuator without requiring a stress sensitive multilayer construction process. Due to the transverse orientation, the structural load path is entirely through the ceramic, not through the electrode/ceramic interface. Furthermore, the interface stress is greatly decreased since the dimensional change in the longitudinal direction is small and inactive material mechanical clamping or pinning is eliminated. Stroke is attained by adjusting the length, not by adding additional layers.

Delineating a monolithic block of ceramic into discrete actuators is accomplished by standard micromachining techniques. The transverse configuration is a fault tolerant design which does not require precision tolerances to prevent damaging or shorting out electrodes during manufacture. Electrical interconnection of electrodes is greatly simplified. Electrical addressing of individual actuators is accomplished through the monolithic block which is polished and contains exposed electrodes. Printed circuit technology is used to provide the electrical interconnection between the discrete addressing actuator channels and the electronic driver. The result is a microactuator technology capable of providing sufficient stroke even at very small interactuator spacing without the need for multilayer construction or microscopic electrical interconnections. The design is easily fabricated without precision machining and is extremely stress tolerant during electrical activation. Furthermore, the design is inherently low voltage which is compatible with hybrid microelectronic driver technology. Electrical addressing and interconnection is done at a common back plane which lends itself to transverse scaling. The concept provides a high performance, scalable microactuator technology using conventional electroceramic fabrication and processing technology.

Figure 12:
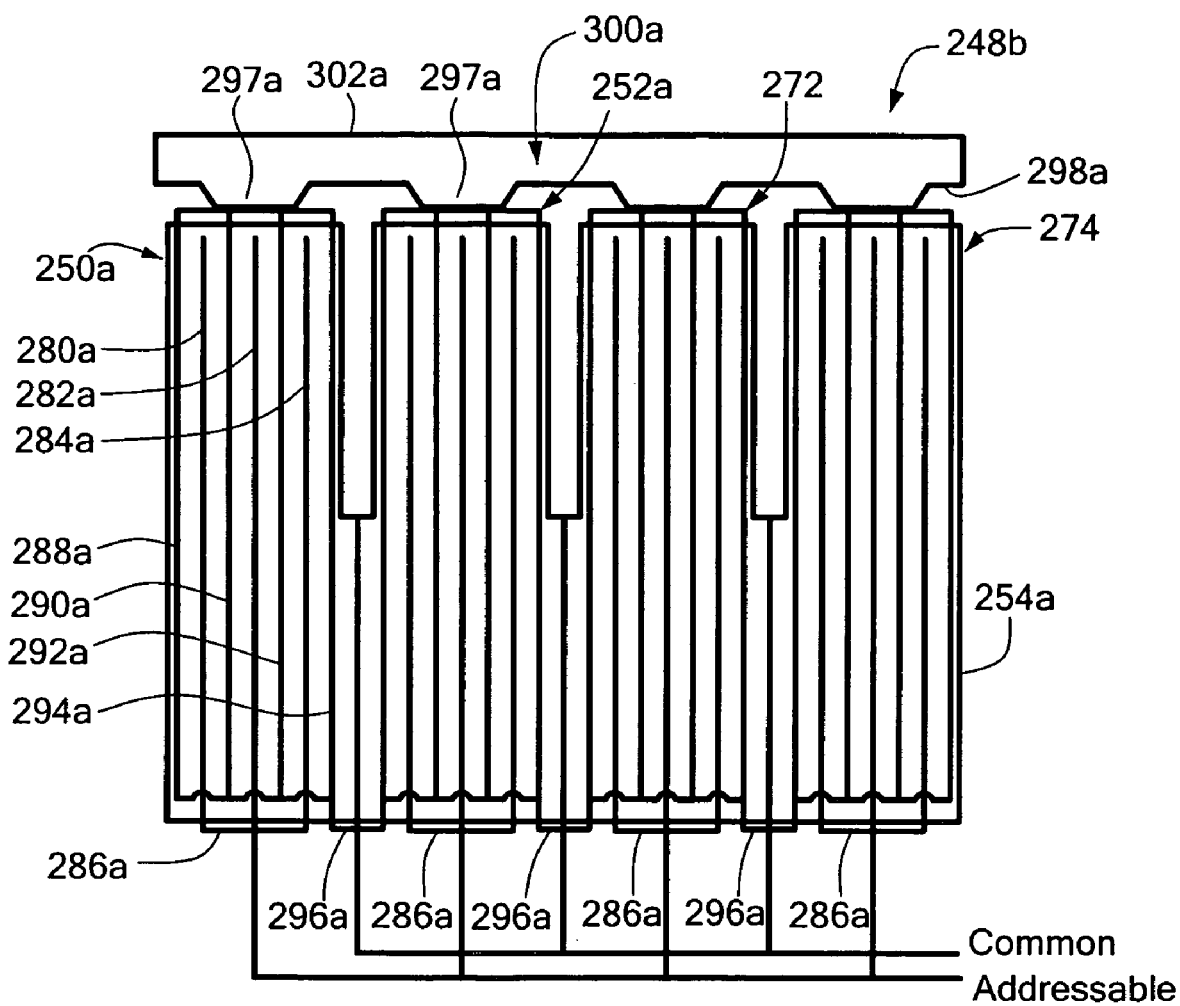
FIG. 12 is a simplified schematic view similar to FIG. 11 but with the common electrodes brought out through the support structure.

Although in FIG. 11 the transverse electrodisplacive actuator array was shown having its common electrode 296 carried by the mounting surface 298 of reflective member 300 this is not a necessary limitation. As shown in FIG. 12, in array 248b, reflective member 300a may be constructed without a contact on its mounting surface 298a and instead the common contacts 296a for the common electrodes may be established at surface 299. In that way the array including actuators 250a, 252a, 272 and 274 may be fully powered and tested before the reflective member, 300a is attached by bonding or adhesive.

Figure 13:
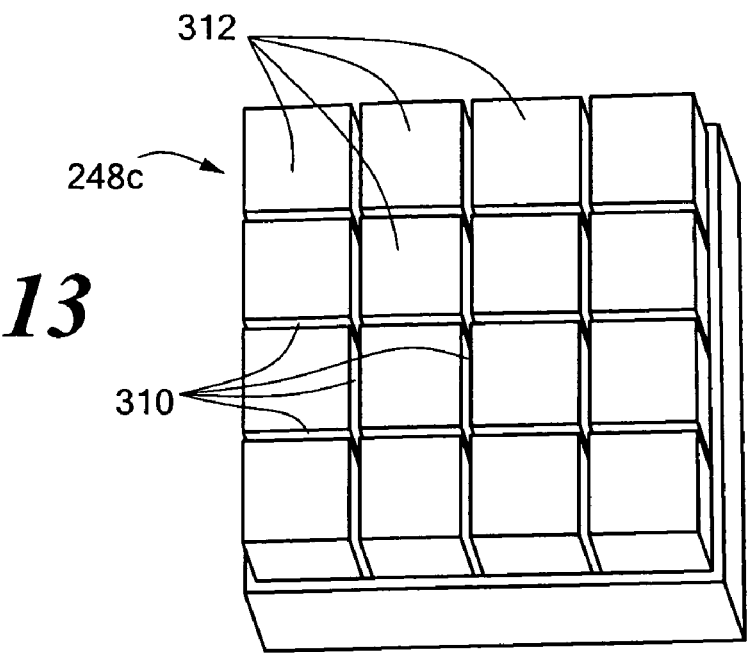
FIGS. 13 and 14 are three-dimensional views of a transverse electrodisplacive actuator array with increased numbers of actuator elements.
Figure 14:
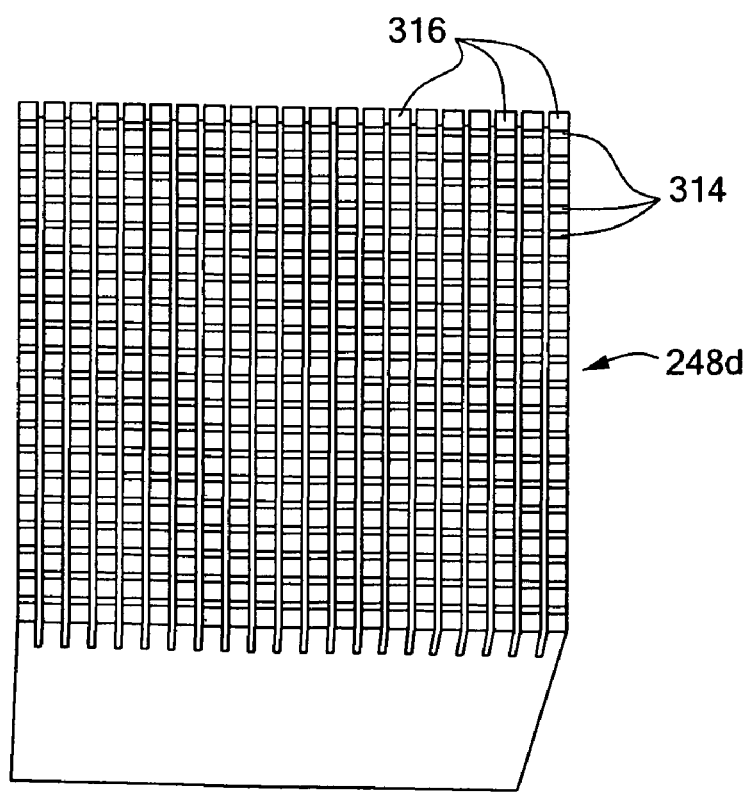

The entire array, both the support structure 254a, and the actuators 250a, 252a, 272 and 274 may be made by effecting cuts in two mutually perpendicular directions down into a block of suitable material ferric ceramic with the cuts or kerfs effecting the separation of the actuators into the individual elements. There may just a few cuts, 300, and resulting actuators, 312, as shown with respect to array 248c, FIG. 13 or there may be many cuts, 314, resulting in many actuators, 316, as shown with respect to array 248d, FIG. 14. The interconnection of transverse electrodisplacive actuator array 248e, FIG. 15 having a multiplicity of actuators 320, carried by support structure 322, may be made by forming the contacts 286a and 296a, FIG. 12, on the lower surface 323, FIG. 15, using solder pads, 324, on top of which is fastened a socket grid array, 326, to receive the pin grid array, 328 carried by flex cable 330.

Figure 15:
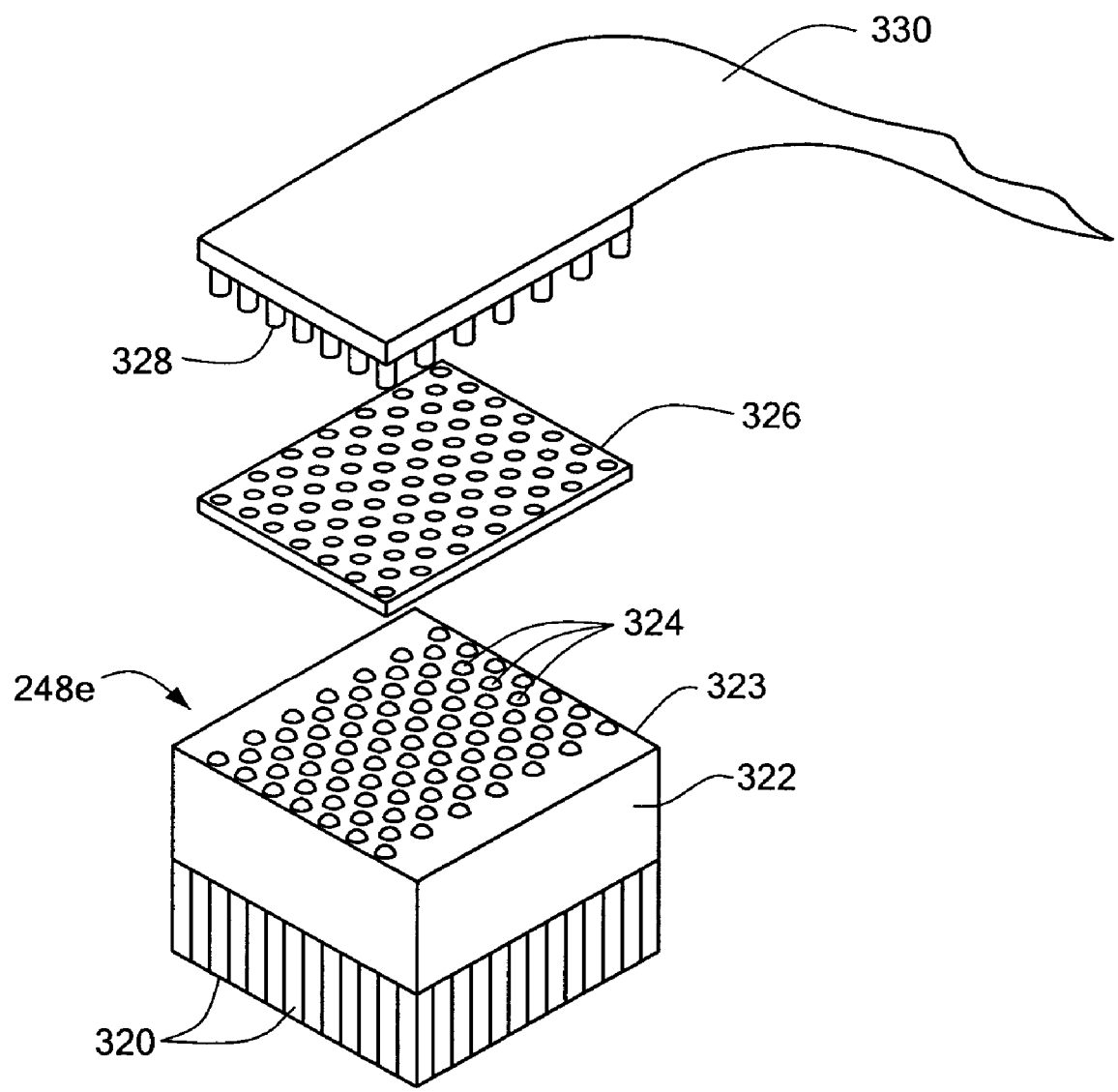
FIG. 15 is an exploded three dimensional view of the transverse electrodisplacive actuator array of FIG. 14 and its electrical interconnection.
Figure 16:
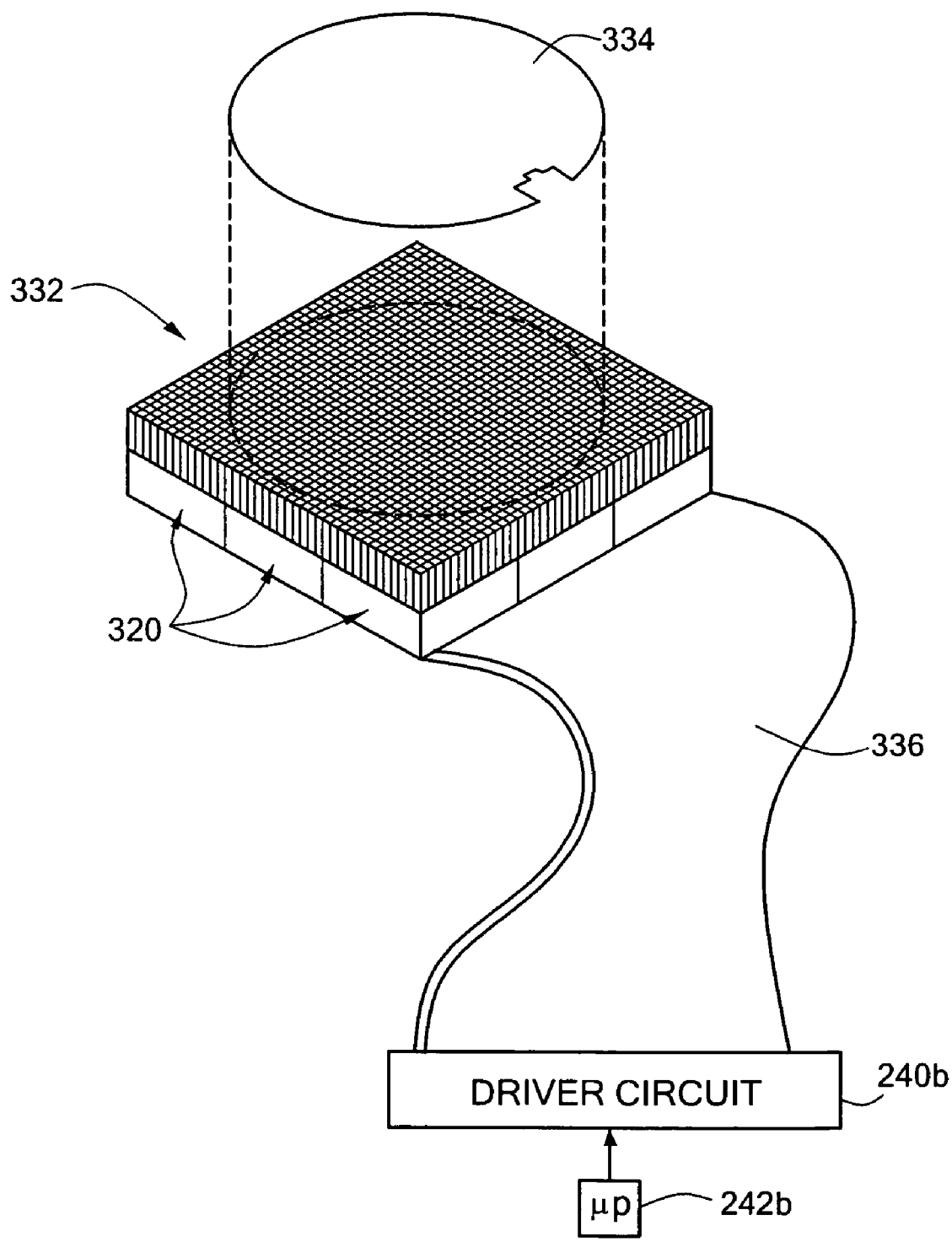
FIG. 16 is a three dimensional view of number of arrays of FIG. 14 in a modular arrangement with a driver circuit.
Figure 17A:
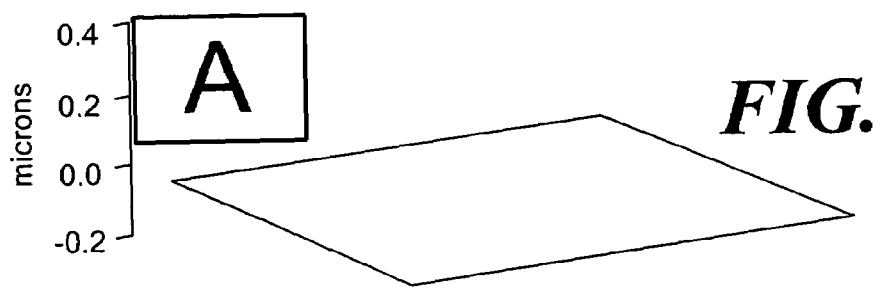
FIGS. 17 A–D illustrate the localized deformation of the mirror surface by the transverse electrodisplacive actuator array.
Figure 17B:
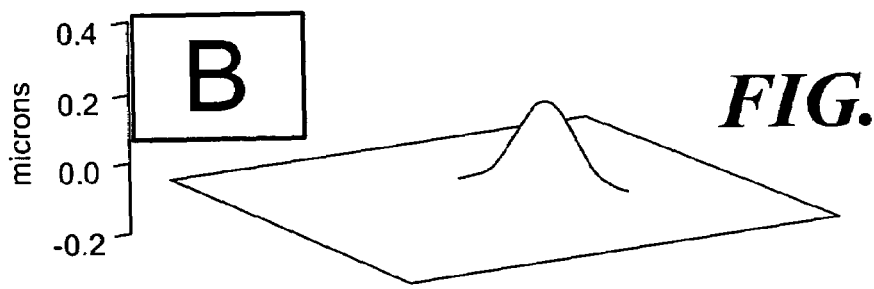
Figure 17C:
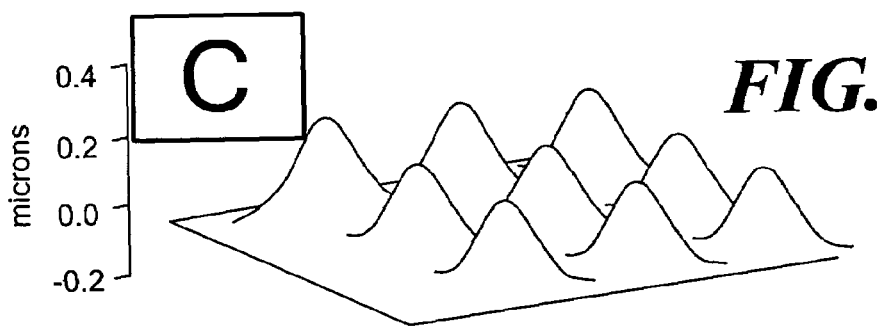
Figure 17D:
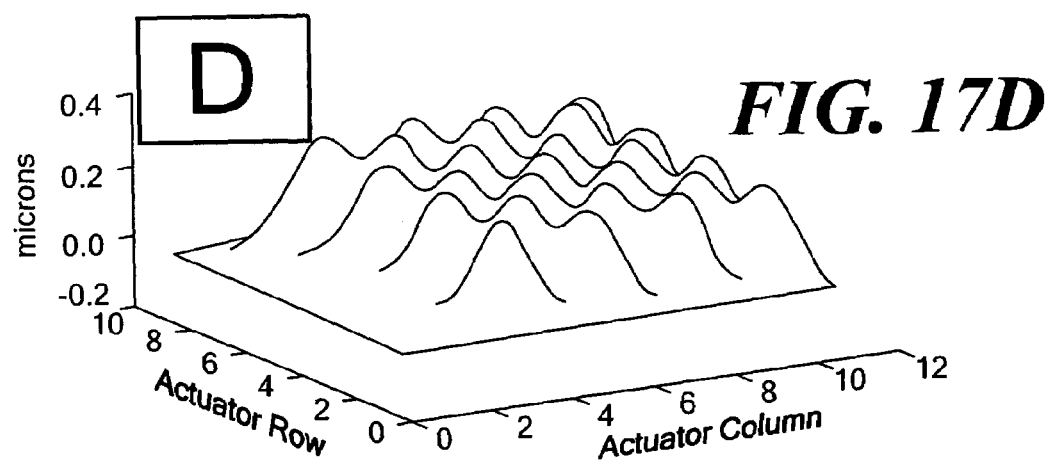

The advantageous modularity of the transverse electrodisplacive actuator array according to this invention is displayed in FIG. 16, where it can be seen that a number of smaller transverse electrodisplacive actuator arrays 320, FIG. 15 are combined in FIG. 16, to form a larger assembly, 332, to accommodate a much larger reflective member, 334 which also may be a continuous surface. Now all of the flex cables represented by a single cable, 336, are connected to driver circuit, 240b, which is driven by microprocessor 242b. With selected programming of driver circuit 240b by microprocessor 242b, it is possible to have an unenergized active aperture as shown in FIG. 17A; a single actuator energized to about 250 nm as shown in FIG. 17B, every third actuator energized as shown in FIG. 17C or every other actuator energized as shown in FIG. 17D. Multiple modules comprising 1024 actuators or more having one millimeter spacing arranged in 32 by 32 arrays have been demonstrated. Mirror deformations have been obtained, which are 0.25 micrometers at 100 volts and are repeatable to $\lambda/2000$ rms. The average capacitance for each actuator may be 30 nf while the average stroke may be 250 nm.

In another embodiment, multiple modules comprising 144 actuators or more having 2.5 mm spacing arranged in 12 by 12 arrays have been demonstrated. Mirror deformations have been obtained which are 2.5 mm at 100 v and are repeatable to $\lambda/2000$ rms. The average capacitance is 0.5 uf while the stroke is 3.5 mm.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An integrated wavefront correction module comprising:
    a mounting device, including a compound flexure plate having fixed portions and flexible portions;
    a deformable mirror carried by said mounting device for correcting for high spatial and temporal frequency error in an incident wavefront; and
    a tip-tilt correction mechanism including a base and a plurality of tip-tilt actuators interconnected between said base and one of said flexible and fixed portions and a plurality of support posts interconnected between said base and the other of the said flexible and fixed portions for adjusting said mounting device with said deformable mirror to compensate for tip-tilt errors in said incident wavefront.

2. The integrated wavefront correction module of claim 1 in which said mounting device includes a support frame for carrying said deformable mirror.

3. The integrated wavefront correction module of claim 1 in which said deformable mirror includes a mirror surface and a plurality of mirror actuators for deforming said mirror surface.

4. The integrated wavefront correction module of claim 1 in which said mirror surface is mounted at the mid-range of a stroke of said tip-tilt actuators for defining a center of rotation at said mirror surface.

5. The integrated wavefront correction module of claim 1 in which said tip-tilt mechanism includes a flexure end tab for engaging each said tip-tilt actuator with said flexure plate.

6. The integrated wavefront correction module of claim 1 further including a support frame for interconnecting said base and said flexure plate at said fixed portions.

7. The integrated wavefront correction module of claim 1 in which there are at least three support posts and three tip-tilt actuators.

8. The integrated wavefront correction module of claim 1 in which said deformable mirror includes a transverse electrodisplacive actuator array.

9. The integrated wavefront correction module of claim 8 in which said transverse electrodisplacive actuator array includes a support structure, a plurality of ferroic electrodisplacive actuator elements extending from a proximate end at said support structure to a distal end; each actuator element including at least one addressable electrode and one common electrode spaced from said addressable electrode and extending along the direction of said proximate and distal ends along the transverse $d_{31}$ strain axis, a reflective member having a reflective surface and a mounting surface mounted on said actuator elements; and a plurality of addressable contacts and at least one common contact for applying voltage to said addressable and common electrodes to induce a transverse strain in addressed actuator elements to effect an optical phase change in the reflective surface at the addressed actuator elements.

10. The integrated wavefront correction module of claim 9 in which said actuator elements are integrated with said support structure.

11. An integrated wavefront correction module comprising:
    a mounting device;
    a deformable mirror carried by said mounting device for correcting for high spatial and temporal frequency error in an incident wavefront; and
    a tip-tilt correction mechanism including at least one actuator platform, a base, a first set of tip-tilt actuators for adjustably supporting said at least one actuator platform from said base and a second set of tip-tilt actuators for adjustably supporting said mounting device from said at least one actuator platform for adjusting said mounting device with said deformable mirror to compensate for tip-tilt errors in said incident wavefront.

12. The integrated wavefront correction module of claim 11 in which there are a stack of actuator platforms and a number of sets of tip-tilt actuators for interconnecting the first actuator platform in the stack with said base, the last actuator platform in the stack with said mounting device and interconnecting each of said platforms with the adjacent platforms in the stack.

13. The integrated wavefront correction module of claim 11 in which said deformable mirror includes a mirror surface and a plurality of mirror actuators for deforming said mirror surface.

14. The integrated wavefront correction module of claim 13 in which said mirror surface is mounted at the mid-range of a stroke of said tip-tilt actuators for defining a center of rotation at said mirror surface.

15. The integrated wavefront correction module of claim 13 in which said tip-tilt mechanism includes a flexure end tab for engaging each said tip-tilt actuator with said flexure plate.

16. The integrated wavefront correction module of claim 11 further including a control system for powering each set of tip-tilt actuators in a different spectral range of said tip-tilt error.

17. The integrated wavefront correction module of claim 12 further including a control system for powering each set of tip-tilt actuators in a different spectral range of said tip-tilt error.

18. The integrated wavefront correction module of claim 11 in which there are at least three tip-tilt actuators in each set.

19. The integrated wavefront correction module of claim 11 in which said deformable mirror includes a transverse electrodisplacive actuator array.

20. The integrated wavefront correction module of claim 19 in which said transverse electrodisplacive actuator array includes a support structure, a plurality of ferroic electrodisplacive actuator elements extending from a proximate end at said support structure to a distal end; each actuator element including at least one addressable electrode and one common electrode spaced from said addressable electrode and extending along the direction of said proximate and distal ends along the transverse $d_{31}$ strain axis, a reflective member having a reflective surface and a mounting surface mounted on said actuator elements; and a plurality of addressable contacts and at least one common contact for applying voltage to said addressable and common electrodes to induce a transverse strain in addressed actuator elements to effect an optical phase change in the reflective surface at the addressed actuator elements.

21. The integrated wavefront correction module of claim 20 in which said actuator elements are integrated with said support structure.

* * * * *